(12) United States Patent
Chavan Dafle et al.

(10) Patent No.: US 11,741,670 B2
(45) Date of Patent: Aug. 29, 2023

(54) OBJECT MESH BASED ON A DEPTH IMAGE

(71) Applicant: SAMSUNG ELECTRONICS CO., LTD., Suwon-si (KR)

(72) Inventors: Nikhil Narsingh Chavan Dafle, Jersey City, NJ (US); Sergiy Popovych, Seattle, WA (US); Ibrahim Volkan Isler, Saint Paul, MN (US); Daniel Dongyuel Lee, Tenafly, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 17/473,541

(22) Filed: Sep. 13, 2021

(65) Prior Publication Data

US 2022/0277519 A1 Sep. 1, 2022

Related U.S. Application Data

(60) Provisional application No. 63/154,974, filed on Mar. 1, 2021.

(51) Int. Cl.
*G06T 17/20* (2006.01)
*G06T 7/564* (2017.01)
(Continued)

(52) U.S. Cl.
CPC ............ *G06T 17/20* (2013.01); *B25J 9/1697* (2013.01); *G06T 7/564* (2017.01); *G06T 7/70* (2017.01);
(Continued)

(58) Field of Classification Search
CPC ..... G06N 3/08; G06T 7/521; G06T 7/50–596; G06T 7/70–97; G06T 17/00;
(Continued)

(56) References Cited

U.S. PATENT DOCUMENTS 9,262,862 B2 2/2016 Tsai et al.
10,137,646 B2 11/2018 Stevens et al.
(Continued)

FOREIGN PATENT DOCUMENTS

EP         3480782 A1    5/2019
WO      2020/169959 A1  8/2020
WO      2020/0169959 A1 8/2020

OTHER PUBLICATIONS

Qi, Charles Ruizhongtai, et al. "Pointnet++: Deep hierarchical feature learning on point sets in a metric space." Advances in neural information processing systems 30 (Year: 2017).*

(Continued)

*Primary Examiner* — Diane M Wills
(74) *Attorney, Agent, or Firm* — Sughrue Mion, PLLC

(57) ABSTRACT

A depth image is used to obtain a three dimensional (3D) geometry of an object as an object mesh. The object mesh is obtained using an object shell representation. The object shell representation is based on a series of depth images denoting the entry and exit points on the object surface that camera rays would pass through. Given a set of entry points in the form of a masked depth image of an object, an object shell (an entry image and an exit image) is generated. Since entry and exit images contain neighborhood information given by pixel adjacency, the entry and exit images provide partial meshes of the object which are stitched together in linear time using the contours of the entry and exit images. A complete object mesh is provided in the camera coordinate frame.

20 Claims, 11 Drawing Sheets

(51) Int. Cl.
*G06T 7/20* (2017.01)
*G06T 19/00* (2011.01)
*G06T 7/70* (2017.01)
*B25J 9/16* (2006.01)

(52) U.S. Cl.
CPC .. *G06T 19/006* (2013.01); *G06T 2207/10028* (2013.01); *G06T 2207/20084* (2013.01)

(58) Field of Classification Search
CPC ................. G06T 17/20; G06T 19/006; G06T 2207/10028; G06T 2207/20081; G06T 2207/20084
See application file for complete search history.

(56) References Cited

U.S. PATENT DOCUMENTS

| | | | |
|---|---|---|---|
| 2013/0286012 | A1 | 10/2013 | Medioni et al. |
| 2014/0099017 | A1 | 4/2014 | Tsai et al. |
| 2014/0226156 | A1* | 8/2014 | Bergman ............. G01N 21/954 356/241.1 |
| 2015/0371432 | A1 | 12/2015 | Medioni et al. |
| 2020/0361083 | A1 | 11/2020 | Mousavian et al. |
| 2021/0034221 | A1 | 2/2021 | Phaisanwiphatpong et al. |
| 2021/0374986 | A1* | 12/2021 | Nicastro ................... G06T 7/60 |
| 2022/0164973 | A1* | 5/2022 | Lee ........................... G06T 7/55 |

OTHER PUBLICATIONS

Yao, Yuan, et al. "Front2back: Single view 3d shape reconstruction via front to back prediction." Proceedings of the IEEE/CVF Conference on Computer Vision and Pattern Recognition (Year: 2020).*

Zakharov, Sergey, et al. "Keep it unreal: Bridging the realism gap for 2.5 d recognition with geometry priors only." 2018 International Conference on 3D Vision (3DV). IEEE (Year: 2018).*

Seong-Jae Lim et al., "3D Model Generation Using a Single Drawing", DBPIA, Summer Annual Conference of IEIE, Aug. 19, 2020, 4 pages total.

Communication dated Jun. 7, 2022 issued by the International Searching Authority in counterpart Application No. PCT/KR2022/002867 (PCT/ISA/220, PCT/ISA/210, and PCT/ISA/237).

Jacob Varley et al., "Shape Completion Enabled Robotic Grasping", arXiv:1609.08546v2, Mar. 2017, 8 pages total.

Abubakar Sulaiman Gezawa et al., "A Review on Deep Learning Approaches for 3D Data Representations in Retrieval and Classifications", IEEE Access, vol. 8, Digital Object Identifier 10.1109/ACCESS.2020.2982196, Mar. 20, 2020, 28 pages total.

* cited by examiner

OBJECT MESH BASED ON A DEPTH IMAGE

CROSS REFERENCE TO RELATED APPLICATION

This application claims benefit of priority of U.S. Provisional Application No. 63/154,974 filed Mar. 1, 2021, the contents of which are hereby incorporated by reference.

FIELD

The present disclosure is related to prediction of one or more depth images, generation of an object mesh based on one or more depth images and device actions based on the object mesh.

BACKGROUND

A problem exists in performing a three dimensional (3D) reconstruction of an object seen from a single camera viewpoint. 3D reconstruction methods require several images from different camera viewpoints and registration with an object coordinate frame. Also, there are problems with noise in observed images.

Shape reconstruction performance may be evaluated based on canonical object frame reconstructions with a normalized object scale. This is not ideal for some applications. For example, robotic grasp planning requires a true scale object model in the robot or camera coordinate frame. Pose registration, required to align the reconstruction to the robot or camera coordinate frame, is computationally expensive and can introduce errors. Also, evaluation of reconstruction methods is performed using synthetically rendered images and without significant variation of object position in the image. Such evaluations do not correspond to real robotic environments where measurements are noisy and camera poses might be drastically different than for the images used to train the object reconstruction method. Some datasets are built using real objects such as the YCB dataset. However, such datasets are orders of magnitude smaller than synthetic datasets used for training state-of the-art object reconstruction methods. This is a limitation because the generalizability of reconstruction methods is limited to the objects similar to those in the training datasets.

SUMMARY

Embodiments provide object shell representation for 3D geometry. The depth image of an object captures information about where the rays enter the object expressed as depth from the camera center. The shell representation augments this information with the depth of the point where the ray exits the object. The pair of depth images corresponding to the entry and exit points on the object compose the object shell. Since there is a one-to-one correspondence between the entry and exit points given by the camera rays, the object shell can be represented directly in the camera coordinate frame.

An obtained object mesh is used for robotic applications, in some embodiments.

The obtained object mesh is used for augmented reality screen display applications, in some embodiments.

Shell reconnection produces more accurate reconstructions since it achieves good balance between global features (e.g object type) and local features (e.g surface variations) using skip connections in UNet, as a non-limiting example (see discussion of FIGS. 6 and 7). Other methods tend to place more weight on global features so they tend to produce object shapes similar to those seen during training data and miss on changes in local geometry.

Embodiments provide representation of a 3D object by a series of two or more depth images. Also provided is a prediction network to provide the series of the depth images, including those of the unseen surfaces, given an observed (seen or visible) depth image of the object. Also provided is a network architecture selector to determine the number of depth images necessary for object 3D shape reconstruction, parameters of the prediction network, and resolution of the input image to the prediction network.

In some embodiments, a prediction network outputs both entry and exit depth images. The entry depth output by the network is almost the same as the input entry depth image, but some of the sensor noise gets removed. For example, a cleaned depth image is output by the network along with an exit depth image.

For complex objects (e.g. a bowl or teacup) or views, in some embodiments, the prediction network will output four depth images in total, where a first depth image will be similar to the input entry depth image (with noise removed), a second depth image will represent the positions of the points where camera rays exit the object, a third depth image will represent the points where the camera rays enter the object again and a fourth depth image will represent the points where camera rays exit the object for the last time.

In some instances, camera rays enter and exit the object once, and two depth images are sufficient. In general, the prediction network outputs a series of depth images representing the positions of the points where camera rays virtually pass through. Here, virtual means like an x-ray, no surface blocks the camera ray in defining surfaces and depth images (see FIGS. 3A and 3D).

In some embodiments, prediction outputs are provided by a prediction network which outputs a series of depth images representing the positions of the points where camera rays virtually pass through.

In some embodiments, an input entry depth image is an original depth image of an object captured by a 3D camera.

In some embodiments, a refined entry depth image is a cleaned image output by the prediction network. The refined entry depth image is the input entry depth image with some noise removed (thus it is a cleaned depth image).

In some embodiments, an exit depth image is an image output by the prediction network which represents the unseen back surface of the object.

Provided herein is an apparatus including: one or more processors; and one or more memories, the one or more memories storing instructions configured to cause the one or more processors to predict, based on an original depth image of an object observed from a camera viewpoint, a series of depth images including an exit depth image corresponding to a first surface of the object hidden from the camera viewpoint; and generate an object mesh based on the series of depth images.

In some embodiments, the instructions are further configured to cause the one or more processors to determine a depth image number, a network level number and/or an image resolution based on a preliminary depth image, and predict the series of depth images based on the depth image number, based on the network level number and/or based on the image resolution.

In some embodiments, the instructions are further configured to cause the one or more processors to determine a reconstruction quality based on a level of reconstruction error and/or based on a level of noise in the original depth image of the object. When the reconstruction quality is not above a threshold, the instructions are further configured to cause the one or more processors to: predict the exit depth image from a second original depth image of the object observed from a second camera viewpoint different than the camera viewpoint, and generate the object mesh based on the exit depth image associated with the second original depth image of the object observed from the second camera viewpoint. When the reconstruction quality is above the threshold, the instructions are further configured to cause the one or more processors to generate the object mesh without a use of the second original depth image.

In some embodiments, the instructions are further configured to cause the one or more processors to predict the series of depth images in a camera coordinate frame along the camera viewpoint.

In some embodiments, the series of depth images includes the original depth image of the object observed from the camera viewpoint.

In some embodiments, the series of depth images includes a cleaned version of the original depth image of the object observed from the camera viewpoint, wherein a noise of the original depth image is reduced in the cleaned version of the original depth image.

In some embodiments, the instructions are further configured to cause the one or more processors to predict the exit depth image by operating on the original depth image with an artificial intelligence (AI) machine, and the AI machine includes a U-Net convolutional neural network (CNN).

In some embodiments, the U-Net CNN includes skip layers.

In some embodiments, the a number of layers in the U-Net CNN is 4.

In some embodiments, the instructions are further configured to cause the one or more processors to generate the object mesh by connecting the entry points of the original depth image with the corresponding exit points of the exit depth image.

In some embodiments, the apparatus of claim 1 includes a robot controller; and a robot arm. The robot controller is configured to control the robot arm to grasp the object based on the object mesh.

In some embodiments, the apparatus of claim 1 includes a video controller; and an augmented reality display screen. The video controller is configured to present rendering of the object as a display image on the augmented reality display screen.

Also presented herein is a method including predicting, based on an original depth image of an object observed from a camera viewpoint, a series of depth images including an exit depth image corresponding to a first surface of the object hidden from the camera viewpoint; and generating an object mesh based on the series of depth images.

Also provided herein is a non-transitory computer readable medium storing instructions, the instructions configured to cause one or more processors of a computer to predict, based on an original depth image of an object observed from a camera viewpoint, a series of depth images including an exit depth image corresponding to a first surface of the object hidden from the camera viewpoint; and generate an object mesh based on the series of depth images.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

DETAILED DESCRIPTION

As mentioned above, embodiments provide object shell representation for 3D geometry. The depth image of an object captures information about where the rays enter the object expressed as depth from the camera center. The shell representation augments this information with the depth of the points where the rays exit the object. The pair of depth images corresponding to the entry and exit points on the object compose the object shell. Since there is a one-to-one correspondence between the entry and exit points given by the camera rays, the object shell can be represented directly in the camera coordinate frame.

An image-to-image architecture is used, in some embodiments, to infer the object shell directly from the input depth image, based on the representation in the camera coordinate frame. With this approach, embodiments provide an architecture to infer the object shell directly from the input depth image. Since depth images (also referred to as shell depth images herein) already include neighborhood information of the points on the object, depth images can be transformed into an object mesh in linear time. The simplicity of the shell representation leads to superior generalizability. Experiments using embodiments show that the shell reconstruction network, trained only on depth images of simple synthetic shapes, outperforms the state-of-the-art object reconstruction methods when tested on real sense depth images of novel (unseen in training) household objects.

Embodiments include robotic applications, such as grasp planning. The shell representation captures geometric information of an object necessary for 6-DOF grasp planning. The object shell allows dense grasp sampling as well as grasp width and quality estimation. Experiments indicate that grasps planned using shell reconstruction provide over 90% grasp success rate.

Due to its robustness to noisy real-world depth images and generalizability to novel shape shapes, the shell representation of embodiments provides a robot the capability to reconstruct the objects in a scene and use those models to effectively to plan robot actions.

Also, an object mesh is used in augmented reality (AR) rendering of an image of the object on a display screen or within AR goggles. The object may then be rendered on the display screen or within the AR goggles for a continuous period of video frames of a virtual scene camera.

Embodiments provide a method to generate a 3D object representation from a single 2D depth image. Embodiments also provide true scale camera coordinate frame reconstruction of the object in real-world environments.

Figure 1:
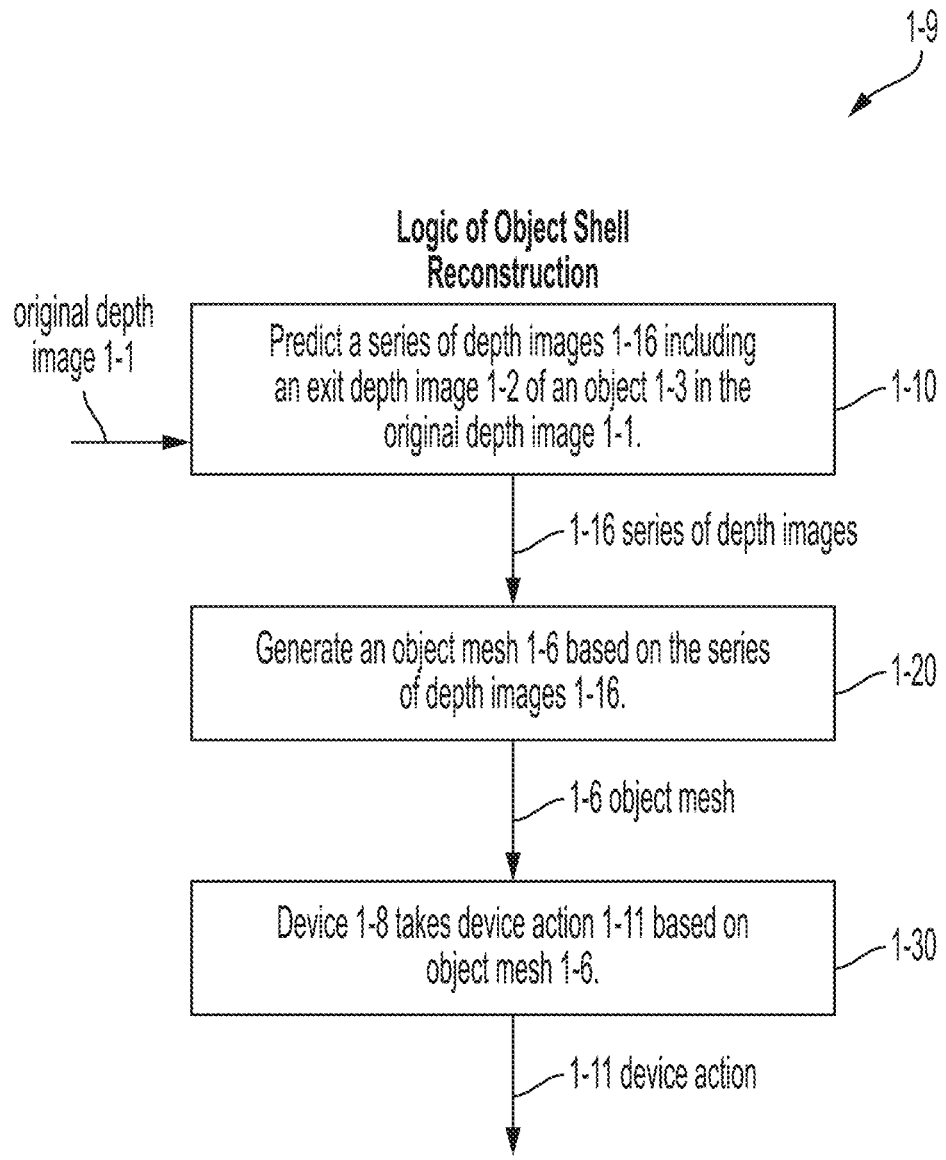
FIG. 1 illustrates logic of predicting a series of depth images, generating an object mesh, and a device taking action based on the object mesh, according to some embodiments.

FIG. 1 illustrates logic 1-9 including operations 1-10, 1-20 and 1-30, according to some embodiments.

At operation 1-10, logic 1-9 predicts a series of depth images 1-16 including an exit depth image 1-2 of an object 1-3; the object 1-3 appears in an original depth image 1-1. In some embodiments, exit depth image 1-2 is the only image in the series of depth images 1-16.

At operation 1-20, logic 1-9 generates an object mesh 1-6 based on the series of depth images 1-16.

At operation 1-30, logic 1-9 takes device action 1-11 based on the object mesh 1-6.

Figure 2:
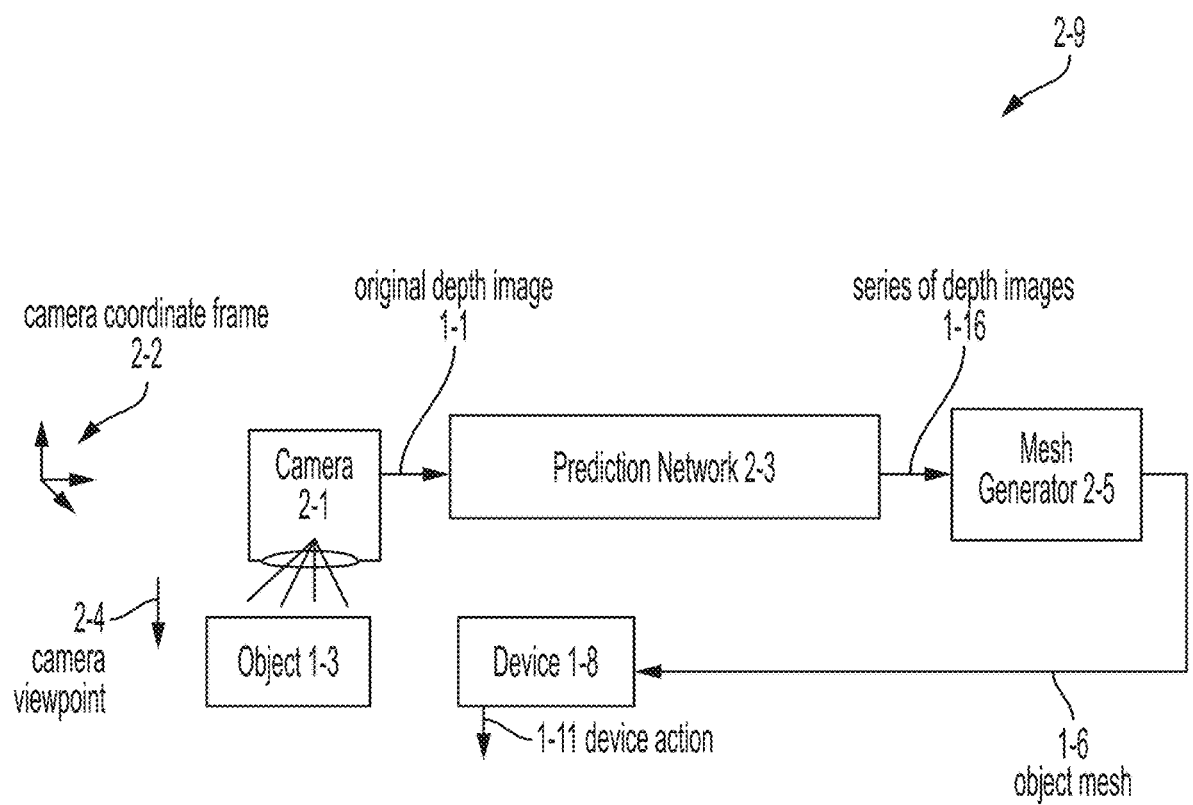
FIG. 2 illustrates a system diagram including a prediction network and a mesh generator, according to some embodiments.

FIG. 2 illustrates a system 2-9 including a prediction network 2-3 and a mesh generator 2-5, according to some embodiments.

Camera 2-1 observes the object 1-3. Camera 2-1 has a camera coordinate frame 2-2 and views the object 1-3 along camera viewpoint 2-4. The camera 2-1 provides the original depth image 1-1 to the prediction network 2-3. The prediction network 2-3 generates the series of depth images 1-16 and provides it to the mesh generator 2-5. The mesh generator 2-5 generates the object mesh 1-6 based on the series of depth images 1-16. The device 1-8 takes device action 1-11 based on the object mesh 1-6. The prediction network 2-3 and the mesh generator 2-5 may be hardware and/or software modules within the device 1-8.

Figure 3A:
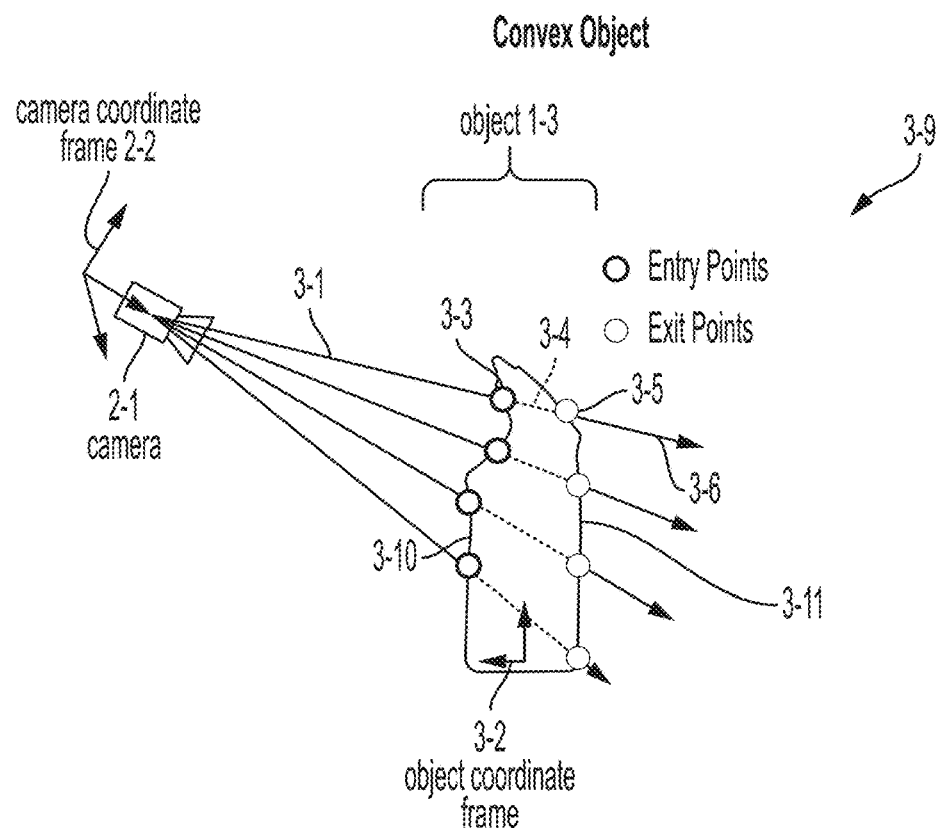
FIG. 3A illustrates camera rays entering an object at entry points and exiting the object at exit points, according to some embodiments.

FIG. 3A illustrates camera rays entering the object 1-3 at entry points 3-3 and exiting the object 1-3 at exit points 3-4, according to some embodiments. The camera has a camera coordinate frame 2-2 and the object has a different reference, object coordinate frame 3-1.

The object 1-3 has a surface 3-10 visible to the camera 2-1 and a surface 3-11 hidden or not observed by the camera 2-1.

In the system 3-9 of FIG. 3A, straight lines are drawn from camera 2-1 through the object 1-3. These lines are called camera rays in this application. In FIG. 3A, the top-most line has line segments 3-1 (heading toward the object 1-3), 3-4 (interior to the object 1-3) and 3-6 (heading away from the object 1-3). The lines pass straight through the object. Intersection of a line with a surface of the object is called a point. When the line enters the object, the point is called an entry point. When a line leaves the object, the point is called an exit point. The collection of entry points define a depth image, specifically referred to as an entry depth image in this application. The collection of exit points define a different depth image, specifically referred to as an exit depth image.

Figure 3B:
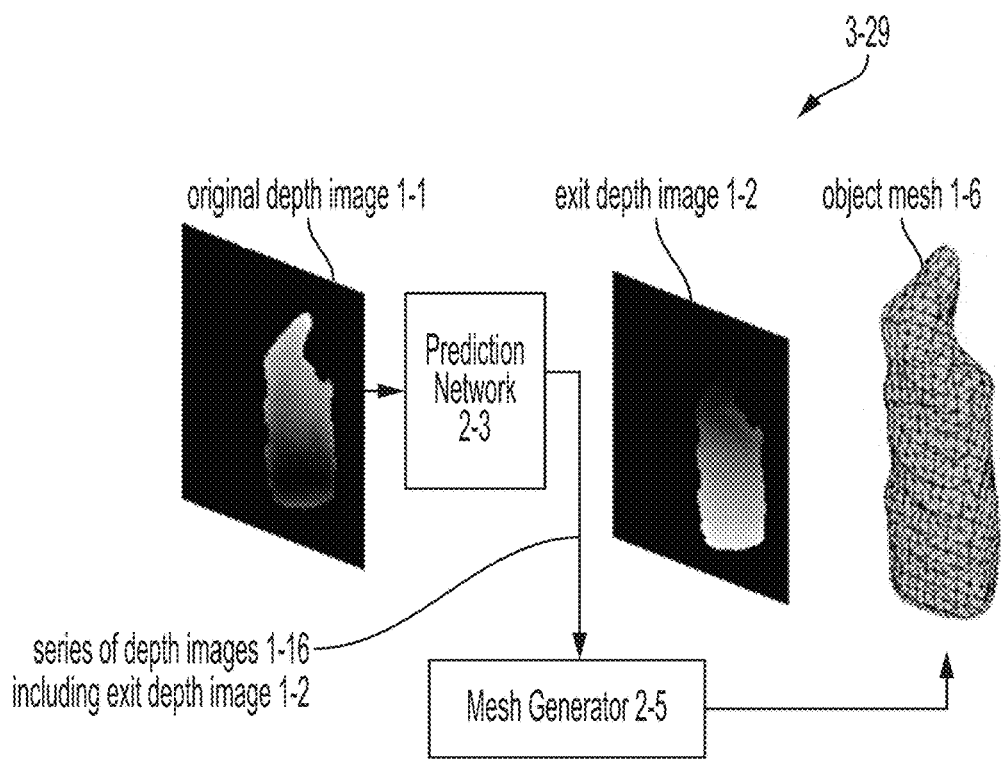
FIG. 3B illustrates the prediction network and the mesh generator producing the object mesh, according to some embodiments.
Figure 3C:
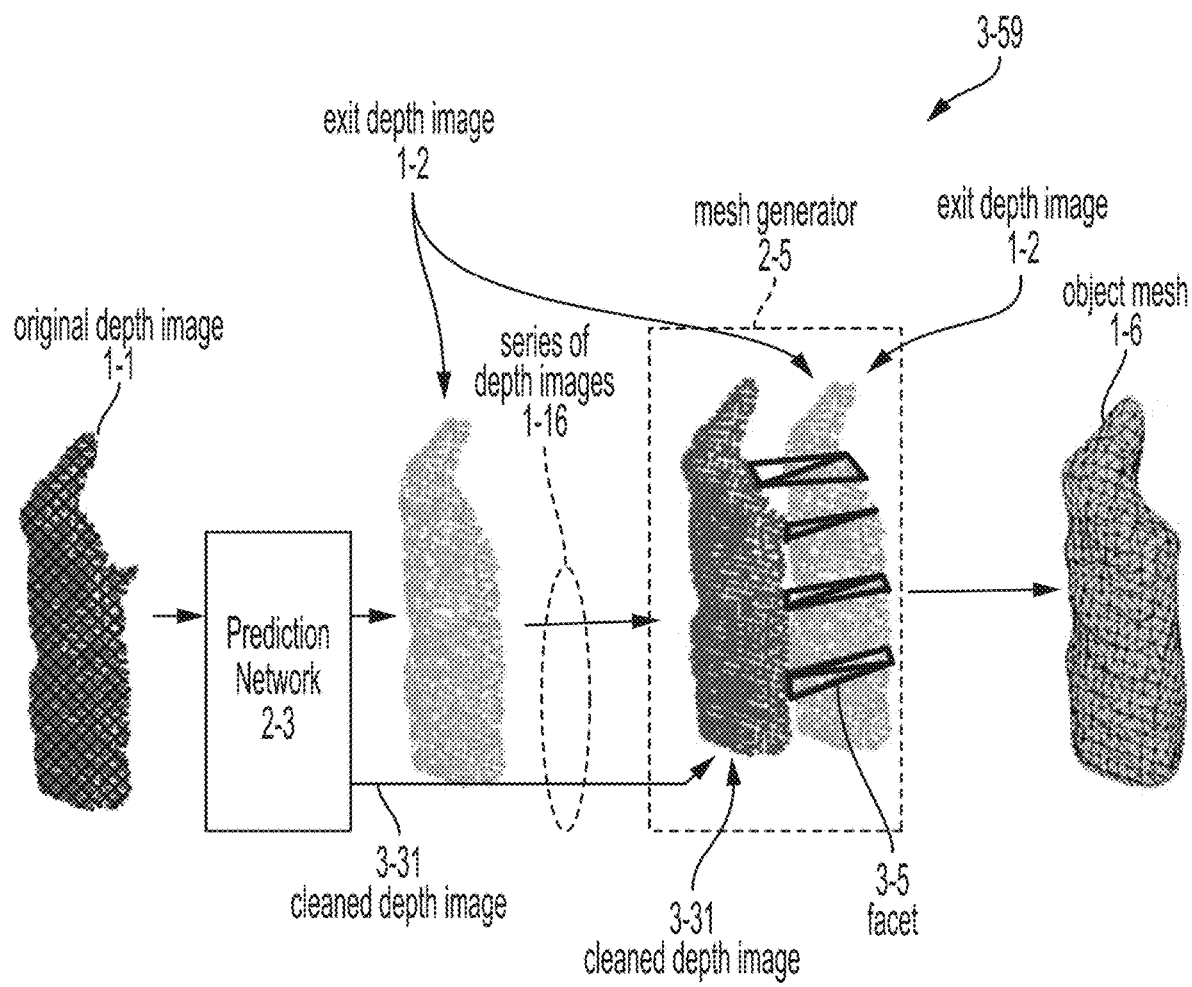
FIG. 3C illustrates the mesh generator stitching together depth images to form the object mesh, according to some embodiments.
Figure 3D:
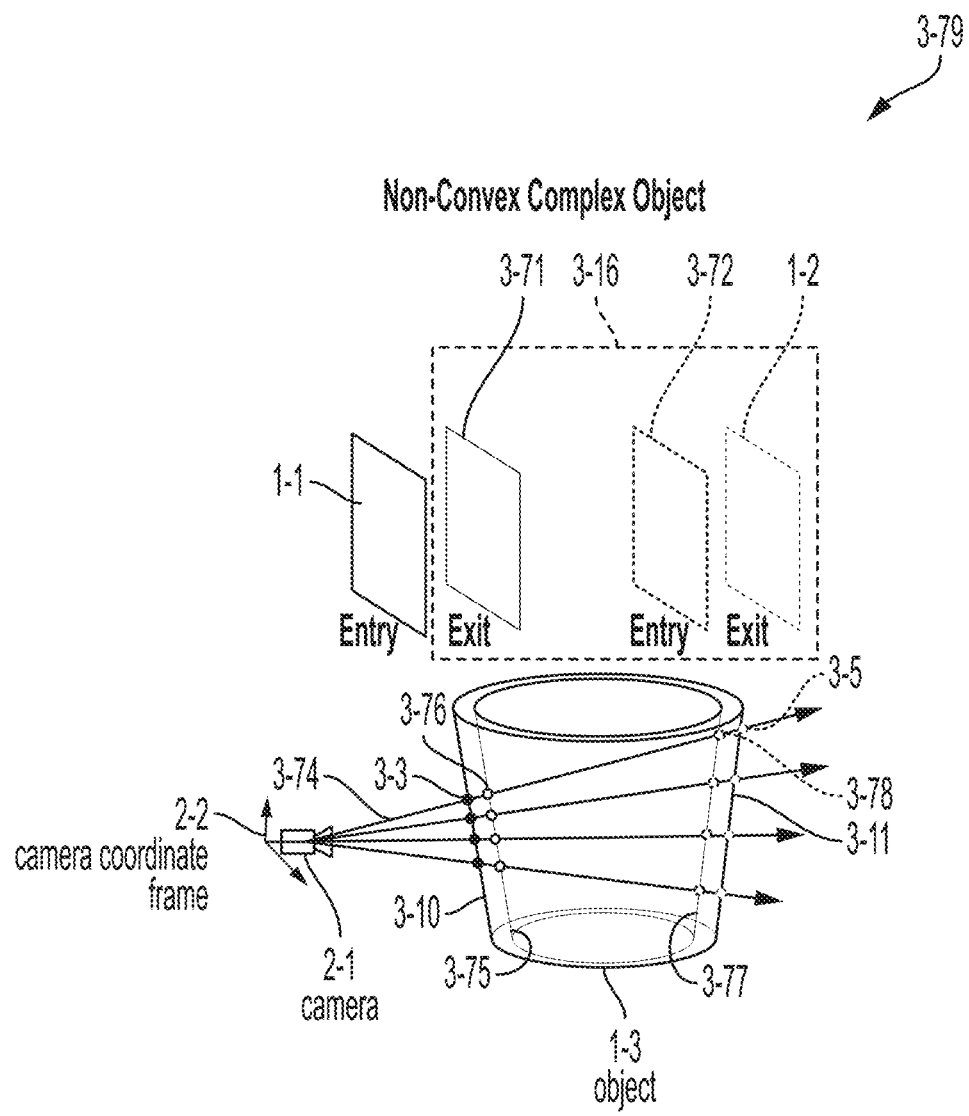
FIG. 3D illustrates camera rays passing through a non-convex complex object, according to some embodiments.

Further explanation is now provided with respect to the intersection of camera rays with the object 1-3 as shown in FIG. 3A (also see FIG. 3D). Suppose r is a set of foreground rays, i.e., their intersection with object 1-3 is non-empty. In general, the camera rays r may enter and exit the object more than once. The object shell is defined as the series of depth images 1-16 in which the first and last depth images (1-1 and 1-2) represent the outer geometry of the object while the intermediate depth images (3-71 and 3-72) capture the points where the camera rays exit and enter the object before completely exiting the object geometry. In some embodiments (convex objects, e.g. as in FIG. 3A), based on the object geometry and the camera view, the camera rays enter and exit the object only once, and a pair of depth images compose the object shell representation. The camera rays enter and exit the object several time passing through multiple object layers (see FIG. 3D).

The shell is a view-dependent description of the object. This property enables the critical advantage of generating the reconstruction directly in the camera coordinate frame. Some methods, for comparison with embodiments, perform reconstructions in the camera coordinate frame by transforming coarse voxels to a mesh. In contrast, the shell representation of embodiments provided herein is a simpler and a direct solution. Also, the shell representation is a concrete application with only a pair of depth images needed to provide sufficient information, in some applications. For example, in a robotic application, successful outer grasps of many household objects are obtained using the object mesh 1-6 provided by embodiments. Also, the image-based shape representation allows posing a 3D reconstruction problem as a 2D pixel prediction problem, and enables using efficient 2D convolutions and image-to-image network architectures. Since the shell layers (entry and exit images) contain the neighborhood information given by pixel adjacency, they provide partial meshes of the object which can be stitched together in linear time to generate an object mesh in the camera frame. Thus, embodiments presented herein improve the computer efficiency of obtaining a 3D representation of an object.

FIG. 3B illustrates a system 3-29 in which an example original depth image 1-1 entering the prediction network 2-3. The prediction network produces the illustrated exit depth image 1-2 which is included in the series of depth images 1-16. The mesh generator 2-5 produces the object mesh 1-6, shown as an example in FIG. 3B.

FIG. 3C introduces a cleaned depth image 3-31 which is a refined entry depth image. In the system 3-59, original depth image 1-1 enters the prediction network 2-3 which produces two depth images at the output: exit depth image 1-2 and cleaned depth image 3-31 which is an improved, reduced noise, version of the original depth image 1-1. These two outputs (together form the series of depth images 1-16 in the example of FIG. 3C).

Mesh generator 2-5 meshes together the cleaned depth image 3-31 and the exit depth image 1-2 using facets such as facet 3-5 to form the object mesh 1-6.

FIG. 3D illustrates camera rays passing through a non-convex complex object, according to some embodiments.

In the example of FIG. 3D, object 1-3 has a teacup shape. A surface of object 1-3 observed by the camera 2-1 is 3-10. An inner surface of teacup shape closer to the camera 2-1 is surface 3-75. An inner surface of the teacup shape further from the camera 2-1 is surface 3-77. The furthest surface from the camera is surface 3-11.

In the system of 3-79, the series of depth images includes depth image 3-71 (a left inner surface of the teacup shape representing 3-75), depth image 3-72 (a right inner surface of the teacup shape representing 3-77), and exit depth image 1-2 representing 3-11, the exit depth image of the teacup shape for which camera rays are headed away from object 1-3.

The camera ray which begins with line segment 3-74 has entry point 3-3, then exit point 3-76 (defining part of depth image 3-71).

In the non-limiting example of FIG. 3D, a cleaned depth image 3-31 (not shown) may also be produced by the prediction network 2-3. That is, in some embodiments, a cleaned depth image 3-31 corresponding to original depth image 1-1 is also produced with respect to the teacup shape.

Figure 4:
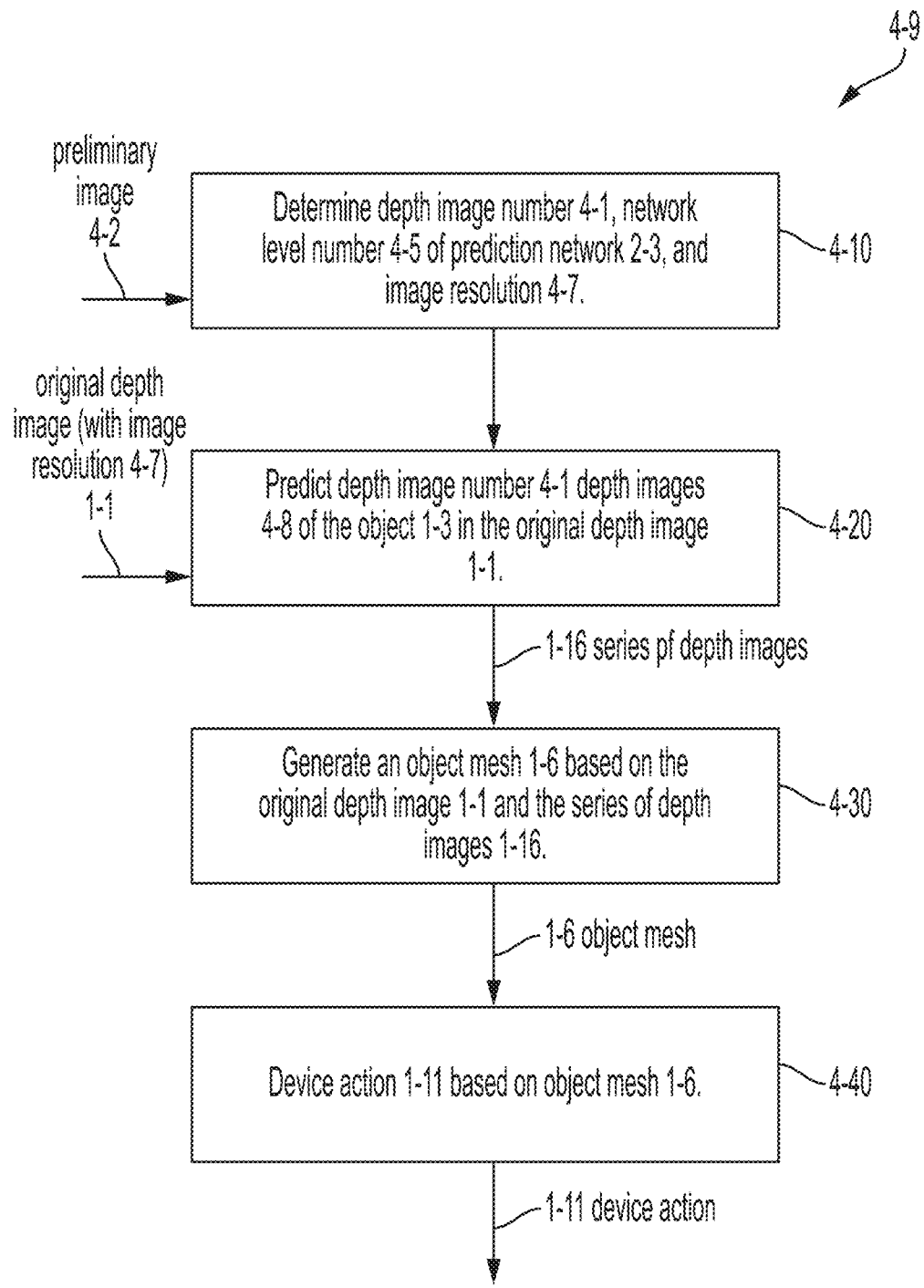
FIG. 4 illustrates logic of determining a resolution and using the resolution to obtain the object mesh, according to some embodiments.

FIG. 4 illustrates logic 4-9 which determines configuration of the prediction network 2-3 and resolution 4-7.

In some embodiments, a preliminary image 4-2 is obtained, as shown in operation 4-10 of logic 4-9. Operation 4-10 determines depth image number 4-1, network level number 4-5 of prediction network 2-3, and image resolution 4-7. Network level number 4-5 is a number of levels in an example UNet (for example, in FIG. 7 there are 4 levels). Original depth image 1-1 is then obtained with image resolution 4-7 and operation 4-20 predicts a quantity equal to depth image number 4-1 of depth images 4-8 of the object 1-3 in the original depth image 1-1. For a convex object such as shown in FIG. 3A, the depth image number 4-1 is two (the series of depth images 1-16 includes one (cleaned) entry image and one exit image). For a complex object such as the teacup shape in FIG. 3D, the depth image number 4-1 is four (item numbers 1-1 (or 3-31), 3-71, 3-72 and 1-2 of FIG. 3D).

In FIG. 4, operation 4-30 is similar to operation 1-20 of logic 1-9. Also, operation 4-40 is similar to operation 1-30 of logic 1-9.

Figure 5A:
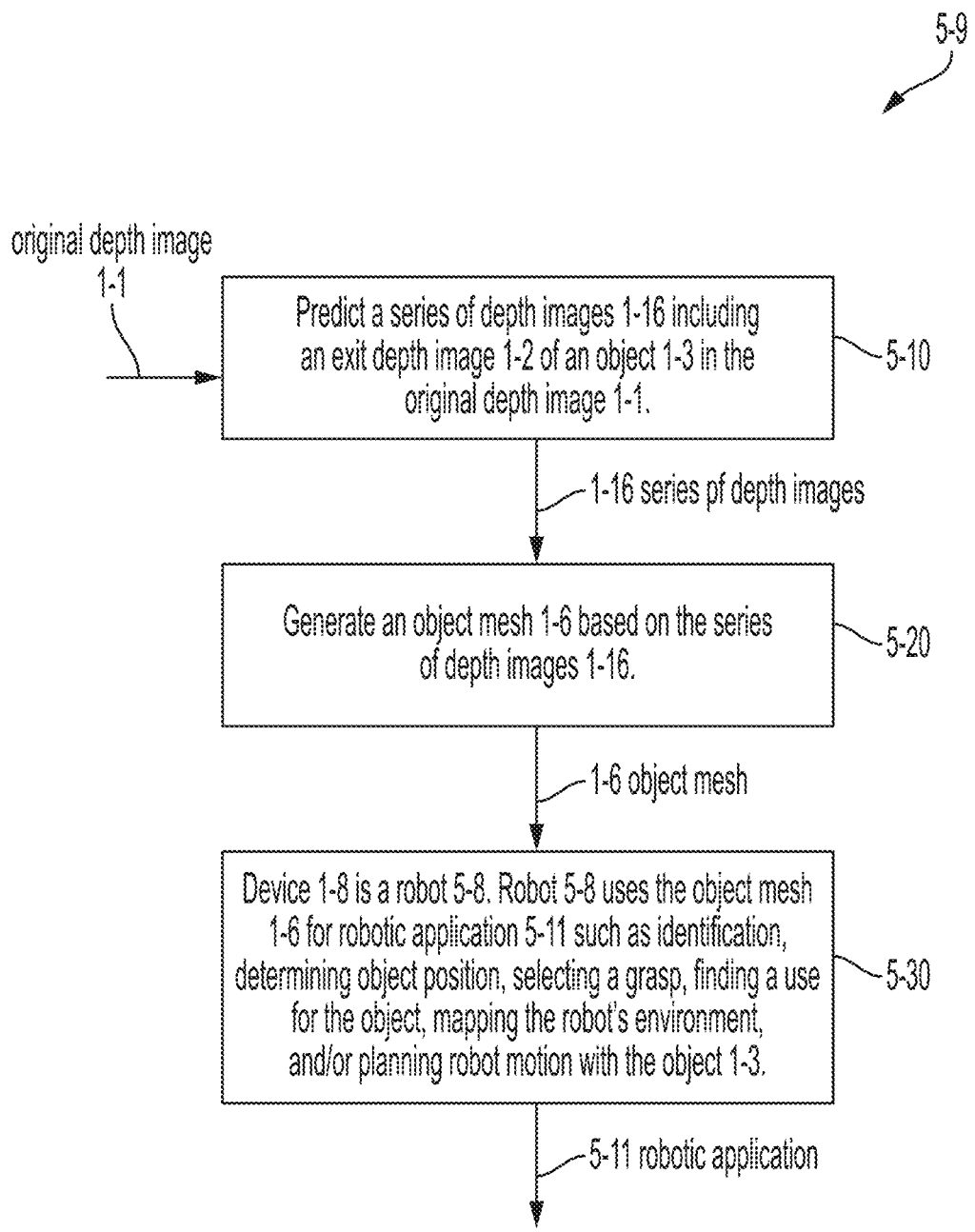
FIG. 5A illustrates logic of a robotic application based on the object mesh, according to some embodiments.

FIG. 5A illustrates logic 5-9 of a robotic application 5-11 based on the object mesh 1-6, according to some embodiments. Operation 5-10 is similar to operation 1-10 of FIG. 1. Operation 5-20 is similar to operation 1-20 of FIG. 1. Operation 5-30 accepts the object mesh 1-6 and results in robotic application 5-11. Specifically, in the example of FIG. 5A, device 1-8 is a robot 5-8. Robot 5-8 uses the object mesh 1-6 for robotic application 5-11 such as identification, determining object position, selecting a grasp, finding a use for the object, mapping the robot's environment, and/or planning robot motion with the object 1-3.

Figure 5B:
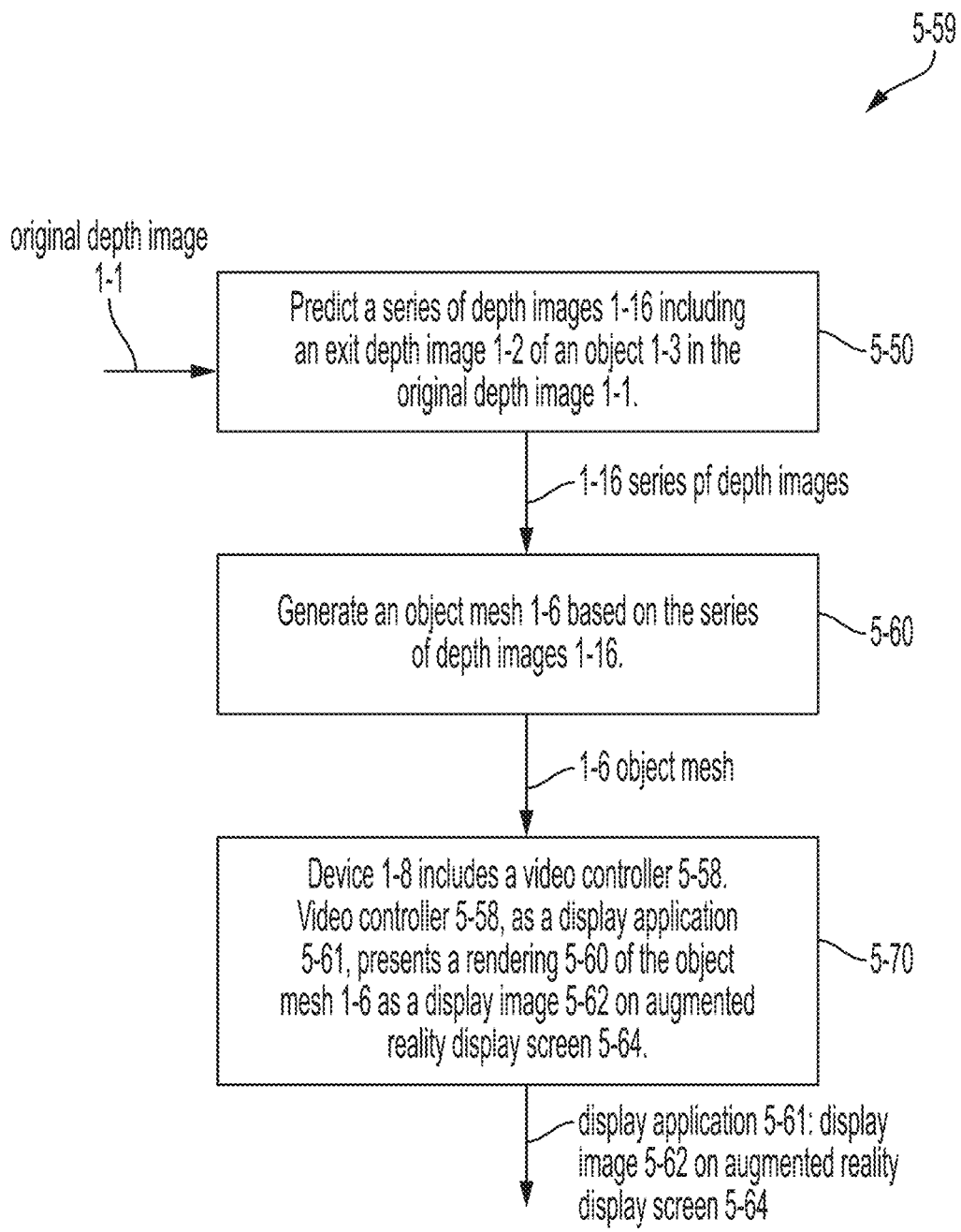
FIG. 5B illustrates logic of a display application based on the object mesh, according to some embodiments.

FIG. 5B illustrates logic 5-59 of a display application 5-61 based on the object mesh 1-6, according to some embodiments. Operation 5-50 is similar to operation 1-10 of FIG. 1. Operation 5-60 is similar to operation 1-20 of FIG. 1. Operation 5-70 accepts the object mesh 1-6 and results in display application 5-11. In the example of FIG. 5B, device 1-8 includes a video controller 5-58.

Video controller 5-58, as a display application 5-61, presents a rendering 5-60 of the object mesh 1-6 as a display image 5-62 representing the object 1-3 on an augmented reality display screen 5-64.

Figure 6:
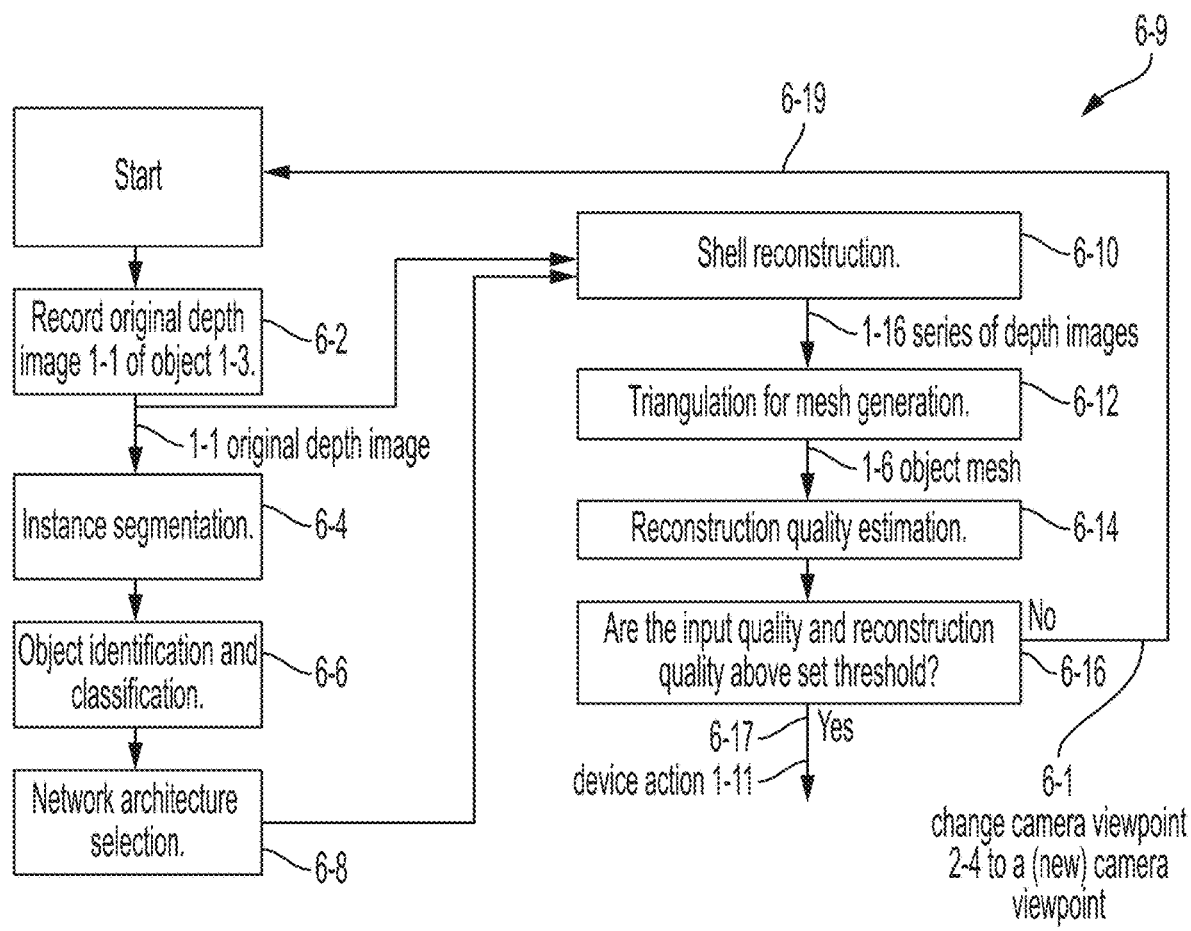
FIG. 6 illustrates logic of performing a network architecture selection and a reconstruction quality estimation, according to some embodiments.

FIG. 6 illustrates logic 6-9 of performing a network architecture selection 6-8 and a reconstruction quality estimation 6-14 to determine if a new camera viewpoint 6-1 is needed, according to some embodiments.

The logic flow starts in the upper left at "Start" and proceeds to operation 6-2. At operation 6-2, logic 6-9 records a depth image of the object 1-3 in a scene (original depth image 1-1) observed from camera viewpoint 2-4. Color may also be recorded.

The original depth image 1-1 is processed both by operations 6-4 and 6-10.

At operation 6-4, instance segmentation may be applied to the original depth image 1-1.

At operation 6-6, object identification and classification may be applied to instances from operation 6-4.

At operation 6-8, network architecture parameters are selected based on the identification and classification from operation 6-6. These parameters may include, for example, depth image number 4-1, network level number 4-5 of prediction network 2-3, and image resolution 4-7. If needed, a new original depth image 1-1 is obtained (see FIG. 4, operation 4-20). The simple convex object of FIG. 3A will cause operation 6-8 to provide a value of two for the depth image number 4-1. In contrast, the complex noncovex teacup shape of FIG. 3D will cause operation 6-8 to provide a value of four for the depth image number 4-1.

Let f (O, T) be the number of shell layers necessary to represent an object 'O' at pose (position and orientation) "T" in the camera coordinate frame. A shell layer is a pair of entry and exit depth images. The complexity C of an object O is $$C(O) = \max_{T \in SE(3)} f(O, T).$$

The number of shell layers needed for an object is f (•)=C(O). SE(3) represents the space of all positions and orientations in a 3 dimensional world. Thus, T in SE(3) means a transformation which T can be any position and orientation in the 3 dimensional world.

Embodiments provide two approaches for selecting the number of shell layers, f.

As a first approach, the function f (•) can be found using a dataset of known objects in different positions and orientations and the object complexity found analytically, and training a neural network (NN) to estimate the complexity of the object given the RGBD image of the unknown objects at test time. Embodiments set the number of shell layers necessary equal to the complexity of the object.

This NN can be a convolutional neural network (CNN) type of network where given an input RGBD images, initial convolutional layers extract the features followed by fully connected layers to estimate the object complexity from the features.

As a second approach, object class or type is used along with a class-to-complexity mapping table (see Table 1 below). Using a dataset of known objects and labels for class of the objects, embodiments train a NN to predict the object class (such as bottle, bowl, cup, table, cellphone, car, etc.) from the a given RGBD image and then use predefined 'object class to object complexity' table to predict the object complexity. This NN is a CNN style network as described above, in some embodiments.

TABLE 1

| Object Class | Object Complexity | # of Shell Layers |
| --- | --- | --- |
| Cracker Box | 1 | 1 |
| Soda can | 1 | 1 |
| Cellphone | 1 | 1 |
| Cup | 2 | 2 |

TABLE 1-continued

| Object Class | Object Complexity | # of Shell Layers |
|---|---|---|
| Cup with Handle | 3 | 3 |
| Bowl | 2 | 2 |
| Table | 2 | 2 |

The number of levels of a UNet-style network are selected by embodiments based on the object complexity.

The prediction network 2-3 generates a series of depth images from input depth image. It uses UNet-style architecture where the number of levels (depth) of the network is selected by the network selector module based on the estimated object complexity. Each level is composed of 2 convolutional layers with max pool layer per level on the encoder side (contracting path, also referred to as encoder 7-90) and with upscaling layer per layer on the decoder side (expanding path, also referred to as decoder 7-91) (see FIG. 7).

Every additional level increases the area of the image used for extracting features, so features from deeper levels of network tend to capture the high-level information such as object class and type. For objects whose geometry is largely governed by the object type (e.g. most of the coffee cups, soda cans, wine bottles have similar geometry), a deeper level network is more useful. So, based on the certainty of the object type (obtained from instance segmentation at operation 6-4), the number of level of the UNet architecture is selected.

Some embodiments use UNet-style network of number of levels equal to N=3+g(complexity of object O)=3+g(C(O)), where, g(C(O)) represents a function of object complexity. In some embodiments, g(C(O))=C(O), so N=3+C(O). Some embodiments train a neural network to estimate the object complexity given RGBD image of the object.

In some embodiments, a few pretrained shell reconstruction networks (UNet style) of different depth levels are stored on a system (e.g., a robot or a video controller). Based on the estimated object complexity, the reconstruction network of appropriate depth level is used to generate the object reconstruction.

In some embodiments, resolution is selected. Based on the object size, the resolution of the input depth image provided to the shell reconstruction network is adjusted to generate a more detailed geometry of the object. For other object sizes, the resolution is adjusted to generate a less detailed geometry of the object.

An input to the shell reconstruction network is a masked depth image of the object. If the object is farther from the camera or if the object size is small it will appear small in the image and will cover small number (less than 500) of pixels. The resolution of the reconstructed object geometry directly depends on the number of depth pixels in the input image. Therefore, based on the desired resolution of the reconstruction geometry, resolution of the input depth image is adjusted.

In some embodiments, the object reconstruction mesh has about N vertices (for objects of size less than 0.3 m×0.3 m×0.3 m (m is a meter), N>10000 for fine resolution and N<2000 for coarse resolution), and the number of object depth pixels in the input image has about N/2=n pixels. If the original depth image has m object depth pixel present, the image resolution (both width and height) is scaled up or down by a rounded-up integer value closest to square root of (n/m).

Also based, on the application for which the reconstructed object geometry will be used, the resolution of the image is modified in some embodiments to control the details on the reconstruction geometry. For an application such as robotic grasping, high resolution (N>10000 as mentioned before) is necessary. For a simple application, such as collision avoidance, coarse resolution (N<2000) is sufficient. So, based on the application, the desired reconstruction resolution is set and then the resolution of the input depth image is adjusted as explained above.

Returning to the discussion of FIG. 6, at operation 6-10, shell reconstruction is performed using the prediction network 2-3. The shell reconstruction produces the series of depth images 1-16. Operation 6-12 applies triangulation to obtain facets and then meshes or stitches the series of depth images 1-16 together, resulting in object mesh 1-6.

At operation 6-14, a reconstruction quality estimation is performed to determine the quality of the mesh 1-6.

Based on missing data in the input depth image of an object, the quality estimator can accept or discard the input image for shell reconstruction. Given the input depth image some embodiments compute the boundary of the object and the area of inside the boundary of the object ($A_o$), then compute the area of the missing data and holes inside the object boundary ($A_h$). The ratio of area of the missing data over the object area ($A_h/A_o$) represents the quality of the input image. The quality of input image is $$Q_i = 1 - \left(\frac{A_h}{A_o}\right).$$

$Q_i$ ranges between 0 and 1. If $Q_i$ is close to 1, the quality of the input depth image is good. If it is close to 0, the quality is poor.

Some embodiments set the threshold on input quality to 0.8. If $Q_i$ is less than 0.8, the input image is rejected and a new image is captured.

If the object shell reconstruction is bigger than the expected maximum bounds on the object geometry, the reconstruction is discarded.

The input depth image of the object gives the information of half of the object geometry, while the job of the shell reconstruction module is to predict the complete geometry of the object. Based on the input data, some embodiments estimate the bounds on the dimensions of the complete object geometry. Particularly, some embodiments set the threshold in terms of multiples of the dimension of the object visible in the input data. The maximum dimension of the object is any direction should be less than k times the maximum dimension of the object visible in the input data, i.e., max[dim(ShellObj)]<k*max[dim(InputVisibleObj)]

In some embodiments, k=3, i.e., if the shell object reconstruction is bigger than 3 times the maximum dimension of the input visible part of the object, the object reconstruction is discarded.

Returning to FIG. 6, at operation 6-16, a decision is made as to whether the reconstruction quality and the input quality are each above thresholds. If yes (item 6-17), device action 1-11 is then caused to occur.

If no (item 6-19), an action is taken to improve the object mesh. This may be to change the camera viewpoint to camera viewpoint 6-1 and obtain a new original depth image 1-1 and start the process again (return to "Start" in the upper left of FIG. 6).

Figure 7:
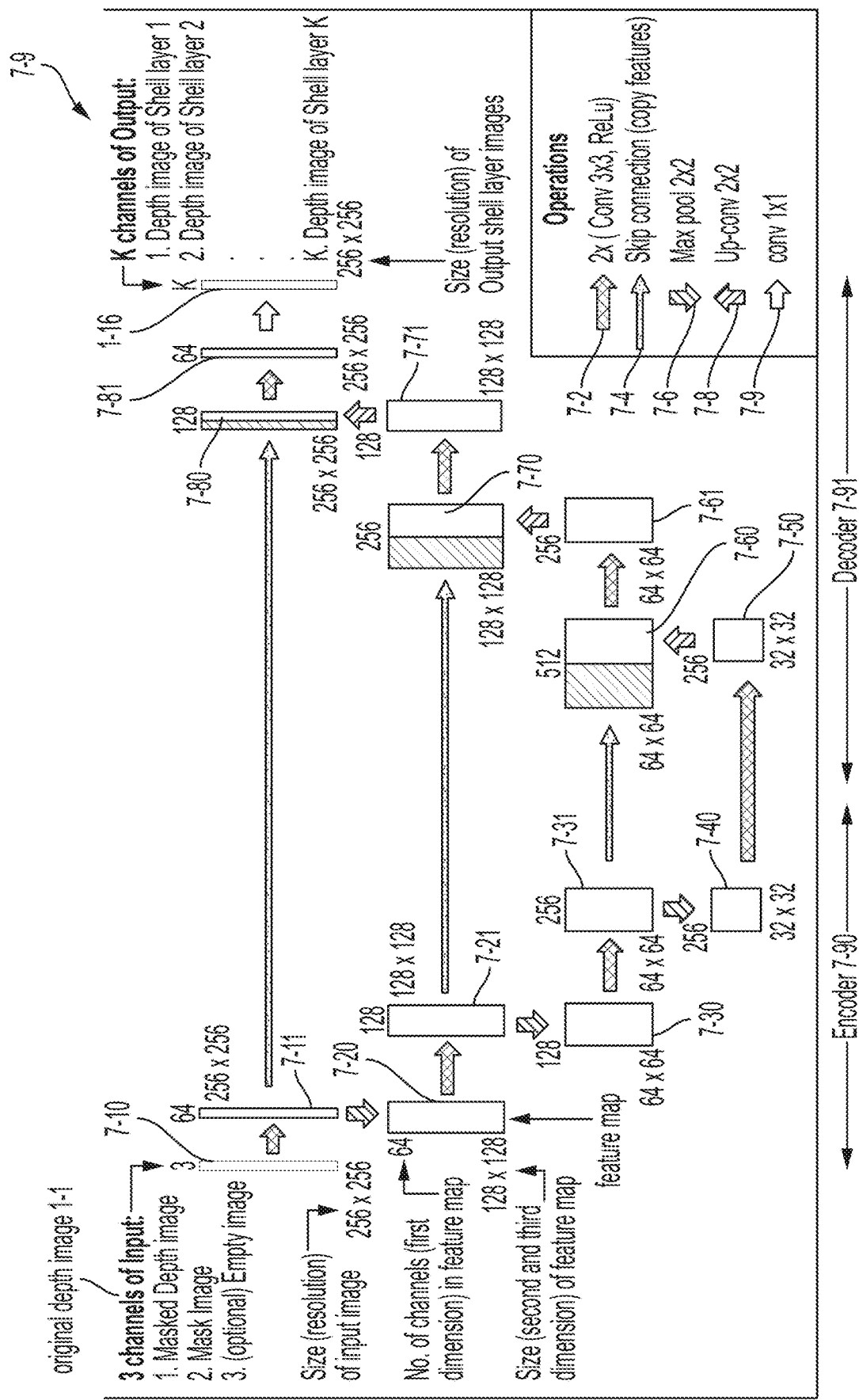
FIG. 7 illustrates an exemplary artificial intelligence model as the prediction network, according to some embodiments.

FIG. 7 illustrates an exemplary artificial intelligence model 7-9 as the prediction network 2-3, according to some embodiments.

Embodiments generate the object shell representation (object mesh 1-6) as a pair of depth images, given a masked depth image of an object observed from a camera. The prediction network 2-3, in some embodiments, is based on UNet—an image-to-image network architecture. Some embodiments use a 4-level UNet architecture (FIG. 7) with mean square error image similarity loss for training. The skip connections in UNet architectures are a powerful tool for tasks with direct relationship of input and output pixels. Skip connections enable feature extraction with large receptive fields while preserving low level features. Experiments show that using these skip connections is provides for high quality shell reconstructions and generalization to novel objects.

FIG. 7 represents an example four level UNet with component parts of encoder 7-90 and decoder 7-91.

Skip connections in UNet prevent a vanishing gradient problem. The skip connections also pass features from an encoder path to a decoder path to retain spatial information lost during downsampling. This provides a large field of view without computational cost to provide prediction based on global features from the images. This is useful for shape generation.

Channels of input 7-10 including original depth image 1-1 are input through convolution and ReLu operations indicated generally as 7-2. The result, data 7-11, passes through a skip connection indicated generally as 7-4. Data 7-11 is also downsampled through a max pool operation indicated generally as 7-6 to provide data 7-20. Data 7-20 then undergoes convolution/ReLu operations to provide data 7-21. Data 7-21 passes through a skip connection. The diagonal gray hashing in the data indicates data which coupled from the encoder 7-90 to the decoder 7-91 via a skip connection. Data 7-21 also passes through a max pool operation to provide data 7-30. Data 7-30 undergoes convolution/ReLu operations to provide data 7-31. Data 7-31 passes through a skip connection. Data 7-31 also goes through a max pool operation to provide data 7-40. Data 7-40 undergoes convolution/ReLu operations to provide data 7-50.

Data 7-50 is upsampled by a convolution operation to obtain data 7-60. Data 7-60 is associated with data 7-31 via a skip connection and both then undergo convolution/ReLu operations to obtain data 7-61. 7-61 is upsampled by a convolution operation to obtain data 7-70. Data 7-70 is associated with data 7-21 via a skip connection and both then undergo convolution/ReLu operations to obtain data 7-71. 7-71 is upsampled by a convolution operation to obtain data 7-80. Data 7-80 is associated with data 7-11 via a skip connection and both then undergo convolution/ReLu operations to obtain data 7-81. A final convolution (item 7-9) is applied to 7-81 to obtain the series of depth images 7-16. In the general case, the series of depth images 7-16 includes the cleaned depth image 3-31.

Embodiments use synthetically generated simple object models and depth images for training of the prediction network 2-3 (e.g., FIG. 7).

Figure 8:
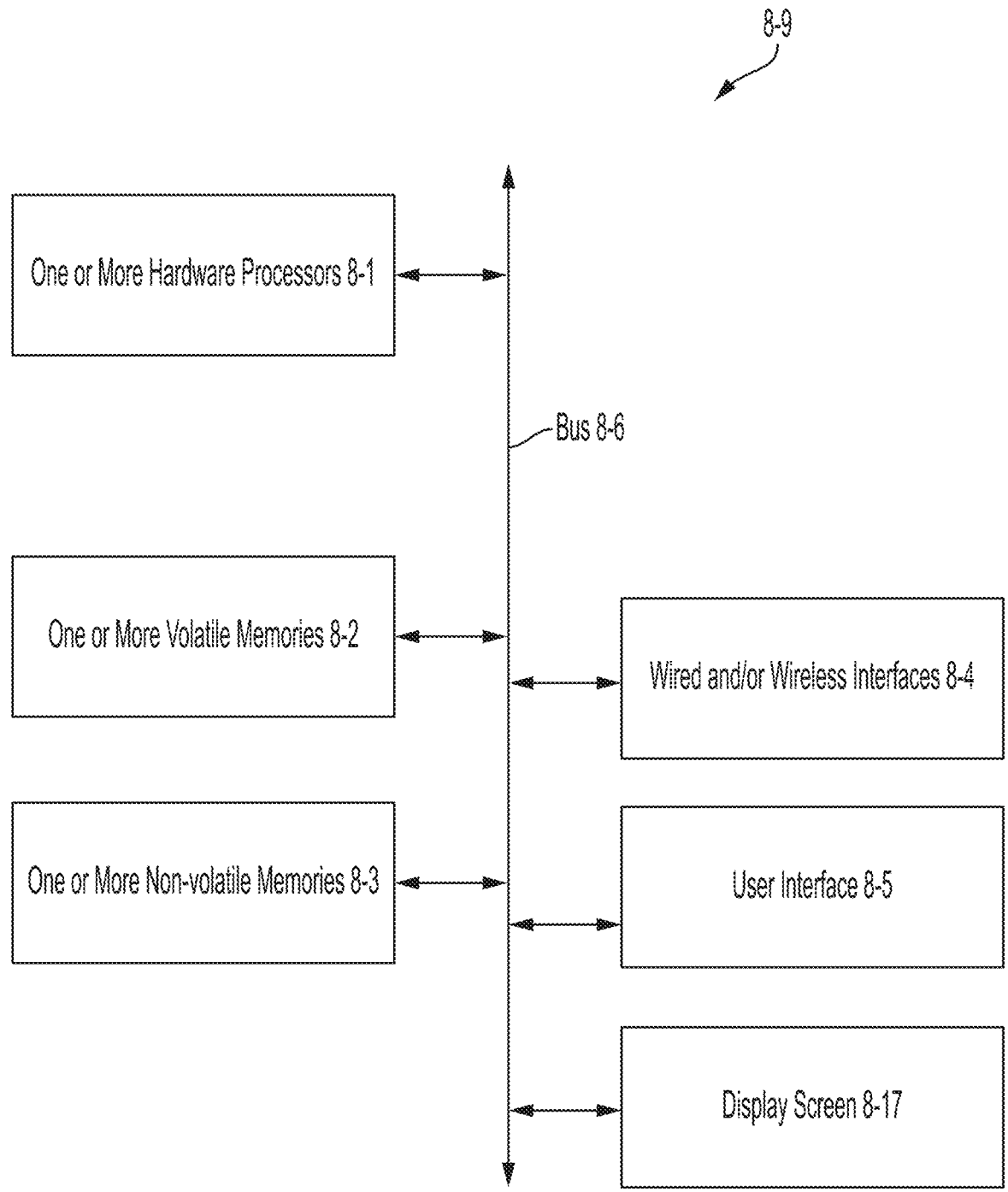
FIG. 8 illustrates exemplary hardware according to some embodiments.

FIG. 8 illustrates an exemplary apparatus 8-9 for implementation of the embodiments disclosed herein. For example, FIG. 8 illustrates exemplary hardware for implementation of computing devices such as prediction network 2-3, mesh generator 2-5 and device 1-8, according to some embodiments. The apparatus 8-9 may be a server, a computer, a laptop computer, a handheld device, or a tablet computer device, for example. Apparatus 8-9 may include one or more hardware processors 8-1. The one or more hardware processors 8-1 may include an ASIC (application specific integrated circuit), CPU (for example CISC or RISC device), and/or custom hardware. Apparatus 8-9 also may include wired and/or wireless interfaces 8-4. Apparatus 8-9 also may include a display screen 8-17. Apparatus 8-9 also may include a user interface 8-5 (for example an additional display screen and/or keyboard and/or pointing device such as a mouse). Apparatus 8-9 may include one or more volatile memories 8-2 and one or more non-volatile memories 8-3. The one or more non-volatile memories 8-3 may include a non-transitory computer readable medium storing instructions for execution by the one or more hardware processors 8-1 to cause apparatus 8-9 to perform any of the methods of embodiments disclosed herein.

Embodiments provide an object shell as an effective geometric representation along with a method for generating the shell of an object from a masked depth image. Embodiments eliminate the need for explicit pose estimation since the reconstruction is performed directly in the camera coordinate frame. Despite being trained on a relatively small amount of synthetic data, the method generalizes well to novel objects and is robust to noise encountered in real depth images. Both of these advantages directly improve applications. For example, a robotic grasp planning process is improved leading to high grasp success rate across novel test objects. The shell representation provides new opportunities to exploit image-to-image networks architecture for 3D shape prediction and 6-DOF grasp and motion planning in clutter.

What is claimed is:

1. An apparatus comprising:
one or more processors; and
one or more memories, the one or more memories storing instructions configured to cause the one or more processors to:
obtain, based on an original depth image of an object observed from a camera viewpoint, a plurality of depth images comprising an exit depth image corresponding to a first surface of the object hidden from the camera viewpoint; and
generate an object mesh based on the plurality of depth images,
wherein the one or more processors are further configured to obtain the plurality of depth images by:
obtaining, based on the original depth image, complexity information of the object,
identifying the number of the plurality of depth images based on the complexity information of the object, and
obtaining the plurality of depth images corresponding to the number.

2. The apparatus of claim 1, wherein the instructions are further configured to cause the one or more processors to:
obtain, based on the original depth image, complexity information of the object;
identify a network level of an artificial intelligence (AI) model based on the complexity information of the object; and
obtain the plurality of depth images using the AI model corresponding to the level.

3. The apparatus of claim 1, wherein the instructions are further configured to cause the one or more processors to:
identify a reconstruction quality based on at least one of a level of reconstruction error or a level of noise in the original depth image of the object, in case that the reconstruction quality is not above a threshold, obtain an exit depth image based on a second original depth image of the object observed from a second camera viewpoint different than the camera viewpoint; and generate the object mesh based on the exit depth image associated with the second original depth image of the object observed from the second camera viewpoint.

4. The apparatus of claim 1, wherein the instructions are further configured to cause the one or more processors to obtain the plurality of depth images in a camera coordinate frame along the camera viewpoint.

5. The apparatus of claim 1, wherein the plurality of depth images includes the original depth image of the object observed from the camera viewpoint.

6. The apparatus of claim 1, wherein the plurality of depth images includes a cleaned version of the original depth image of the object observed from the camera viewpoint, wherein a noise of the original depth image is reduced in the cleaned version of the original depth image.

7. The apparatus of claim 1, wherein the instructions are further configured to cause the one or more processors to obtain the exit depth image by operating on the original depth image using an AI model, and the AI model includes a U-Net convolutional neural network (CNN).

8. The apparatus of claim 7, wherein the U-Net CNN includes skip layers.

9. The apparatus of claim 8, wherein a number of network levels in the U-Net CNN is 4.

10. The apparatus of claim 1, wherein the instructions are further configured to cause the one or more processors to generate the object mesh by connecting an entry point of the original depth image with a corresponding exit point of the exit depth image.

11. The apparatus of claim 1, further comprising:
a robot controller; and
a robot arm, wherein the robot controller is configured to control the robot arm to grasp the object based on the object mesh.

12. The apparatus of claim 1, further comprising:
a video controller; and
an augmented reality display screen, wherein the video controller is configured to present rendering of the object as a display image on the augmented reality display screen.

13. A method comprising:
obtaining, based on an original depth image of an object observed from a camera viewpoint, a plurality of depth images comprising an exit depth image corresponding to a first surface of the object hidden from the camera viewpoint; and
generating an object mesh based on the plurality of depth images,
wherein the obtaining of the plurality of depth images comprises:
obtaining, based on the original depth image, complexity information of the object,
identifying the number of the plurality of depth images based on the complexity information of the object, and
obtaining the plurality of depth images corresponding to the number.

14. The method of claim 13, further comprising:
obtaining, based on the original depth image, complexity information of the object;
identifying a network level of an artificial intelligence (AI) model based on the complexity information of the object; and
obtaining the plurality of depth images using the AI model corresponding to the level.

15. The method of claim 13, further comprising:
identifying a reconstruction quality, based on at least one of a level of reconstruction error or a level of noise in the original depth image of the object;
in case that the reconstruction quality is not above a threshold, obtaining an exit depth image from a second original depth image of the object observed from a second camera viewpoint different than the camera viewpoint; and
generating the object mesh based on the exit depth image associated with the second original depth image of the object observed from the second camera viewpoint.

16. The method of claim 13, wherein the obtaining of the plurality of depth images comprises obtaining the plurality of depth images in a camera coordinate frame along the camera viewpoint.

17. The method of claim 13, wherein the plurality of depth images includes the original depth image of the object observed from the camera viewpoint.

18. The method of claim 13, wherein the predicting and the generating solve a 3D reconstruction problem using a 2D prediction.

19. The method of claim 13, wherein the generating the object mesh comprises connecting an entry point of the original depth image with an exit point of the exit depth image.

20. A non-transitory computer-readable medium storing instructions, the instructions configured to cause one or more processors of a computer to:
obtain, based on an original depth image of an object observed from a camera viewpoint, a plurality of depth images comprising an exit depth image corresponding to a first surface of the object hidden from the camera viewpoint; and
generate an object mesh based on the plurality of depth images,
wherein the instructions are further configured to cause the computer to obtain the plurality of depth images by:
obtaining, based on the original depth image, complexity information of the object,
identifying the number of the plurality of depth images based on the complexity information of the object, and
obtaining the plurality of depth images corresponding to the number.

* * * * *